(12) United States Patent
Li et al.

(10) Patent No.: US 11,210,270 B2
(45) Date of Patent: Dec. 28, 2021

(54) MAPPING STORAGE ACROSS STORAGE PROVIDERS

(71) Applicant: Microsoft Technology Licensing, LLC, Redmond, WA (US)

(72) Inventors: Peng Li, Kirkland, WA (US); Raghunath Ramakrishnan, Bellevue, WA (US); Baskar Sridharan, Sammamish, WA (US); Christopher William Douglas, Mountain View, CA (US); Virajith Jalaparti, San Jose, CA (US); Sriram Rao, Sunnyvale, CA (US); Sri Sai Kameswara Pavan Kumar Kasturi, Redmond, WA (US); Karthick Krishnamoorthy, Sammamish, WA (US); Chakrapani Bhat Talapady, Redmond, WA (US); Krishna Pradeep Reddy Tamma, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1125 days.

(21) Appl. No.: 15/705,988

(22) Filed: Sep. 15, 2017

(65) Prior Publication Data

US 2018/0260392 A1 Sep. 13, 2018

Related U.S. Application Data

(60) Provisional application No. 62/469,413, filed on Mar. 9, 2017.

(51) Int. Cl.
*G06F 16/182* (2019.01)
*G06F 3/06* (2006.01)
*H04L 29/08* (2006.01)

(52) U.S. Cl.
CPC ........ *G06F 16/1827* (2019.01); *G06F 3/0604* (2013.01); *G06F 3/067* (2013.01); *G06F 3/0643* (2013.01); *H04L 67/1097* (2013.01)

(58) Field of Classification Search
CPC .. G06F 16/1827; G06F 3/0604; G06F 3/0643; G06F 3/067; H04L 67/1097
(Continued)

(56) References Cited

U.S. PATENT DOCUMENTS 7,243,089 B2 * 7/2007 Becker-Szendy ....... G06F 16/10
7,441,096 B2 10/2008 Kitamura
(Continued)

OTHER PUBLICATIONS

Scavuzzo; Marco, "A Distributed File System Over Heterogeneous SaaS Storage Platforms", 2014 16th International Symposium on Symbolic and Numeric Algorithms for Scientific Computing, Sep. 22, 2014, pp. 417-421 (hereinafter referred to as Scavuzzo), DOI: 10.1109/SYNASC.2014.62, ISBN: 978-1-4799-8447-3 (Year: 2014).*
(Continued)

*Primary Examiner* — Mark E Hershley
(74) *Attorney, Agent, or Firm* — Workman Nydegger

(57) ABSTRACT

A system that maps files into multiple parts and initiates storage of each part within a respective storage provider. The mapping facilitates this by correlating each of the multiple parts to a corresponding storage provider which may be different than the storage provider that stores a different part of the same file. The system then initiates storage of the multiple parts of the file in each of their corresponding storage provider in accordance with the mapping, and using a storage-provider-facing API. Similarly, retrieval and/or editing of a partial file may be accomplished by referencing the mapping, and using the same API issued to the appropriate storage provider. Each storage provider is capable of interfacing with the system using this same API.

21 Claims, 11 Drawing Sheets

(58) Field of Classification Search
USPC .......................................................... 707/827
See application file for complete search history.

(56) References Cited

U.S. PATENT DOCUMENTS

| | | | | |
|---|---|---|---|---|
| 7,716,180 | B2* | 5/2010 | Vermeulen | H04L 67/1097 |
| | | | | 707/626 |
| 8,935,474 | B1 | 1/2015 | Todd et al. | |
| 9,213,721 | B1 | 12/2015 | Faibish et al. | |
| 9,274,710 | B1* | 3/2016 | Oikarinen | G06F 3/067 |
| 9,390,116 | B1* | 7/2016 | Li | G06F 16/2272 |
| 9,454,331 | B1 | 9/2016 | Bent et al. | |
| 9,852,150 | B2* | 12/2017 | Sharpe | G06F 3/0641 |
| 10,055,420 | B1* | 8/2018 | Pogde | G06F 11/1448 |
| 10,303,797 | B1* | 5/2019 | Menezes | G06F 16/137 |
| 10,496,494 | B1* | 12/2019 | Haloi | G06F 16/148 |
| 10,503,697 | B1* | 12/2019 | Singh | G06F 16/1752 |
| 2002/0095479 | A1* | 7/2002 | Schmidt | G06F 16/192 |
| | | | | 709/218 |
| 2004/0024786 | A1* | 2/2004 | Anderson | G06F 16/10 |
| 2006/0179037 | A1* | 8/2006 | Turner | G06F 16/1844 |
| 2006/0271598 | A1* | 11/2006 | Wong | G06F 16/119 |
| 2009/0106255 | A1* | 4/2009 | Lacapra | G06F 11/1076 |
| 2010/0332401 | A1* | 12/2010 | Prahlad | H04L 63/0428 |
| | | | | 705/80 |
| 2011/0276538 | A1* | 11/2011 | Knapp | G06F 16/1827 |
| | | | | 707/626 |
| 2013/0275653 | A1 | 10/2013 | Ranade et al. | |
| 2014/0006354 | A1* | 1/2014 | Parkison | G06F 3/067 |
| | | | | 707/649 |
| 2014/0006357 | A1* | 1/2014 | Davis | G06F 16/182 |
| | | | | 707/667 |
| 2014/0006465 | A1* | 1/2014 | Davis | G06F 16/183 |
| | | | | 707/827 |
| 2014/0007239 | A1* | 1/2014 | Sharpe | G06F 16/137 |
| | | | | 726/24 |
| 2014/0101158 | A1 | 4/2014 | Kraemer et al. | |
| 2014/0279966 | A1 | 9/2014 | Rajpal et al. | |
| 2015/0278243 | A1* | 10/2015 | Vincent | G06F 16/182 |
| | | | | 707/634 |
| 2016/0261694 | A1 | 9/2016 | Clash et al. | |
| 2016/0350551 | A1* | 12/2016 | Chang | G06F 3/0623 |
| 2016/0371291 | A1 | 12/2016 | Shamis et al. | |
| 2017/0026173 | A1* | 1/2017 | Masek | G06F 16/2228 |

OTHER PUBLICATIONS

Villari et al; Massimo, "Evaluating a File Fragmentation System for Multi-Provider Cloud Storage", Scalable Computing: Practice and Experience, vol. 14, No. 4, Jan. 20, 2014, pp. 265-277, ISSN: 1097-2803, DOI: 10.12694/scpe.v14v4.932 (Year: 2014).*

"International Search Report and Written Opinion Issued in PCT Application No. PCT/US2018/020348", dated May 2, 2018, 12 Pages.

Scavuzzo, Marco, "A Distributed File System over Heterogeneous SaaS Storage Platforms", In Proceedings of the 16th International Symposium on Symbolic and Numeric Algorithms for Scientific Computing, Sep. 22, 2014, pp. 417-421.

Villari, et al., "Evaluating a File Fragmentation System for Multi-Provider Cloud Storage", In Journal of Scalable Computing: Practice and Experience, vol. 14, Issue 4, Jan. 20, 2014, pp. 265-277.

* cited by examiner

Naming Service 600
| File Name | File ID | Parent ID | Children ID(s) |
|---|---|---|---|
| myfolder | 100 | (none) | 120, 123 |
| ABC | 120 | 100 | (none) |
| XYZ | 123 | 100 | (none) |
*Fig. 6B*
Naming Service 600
| File Name | File ID | Parent ID | Children ID(s) |
|---|---|---|---|
| myfolder | 100 | (none) | 123 |
| newfolder | 200 | (none) | 120 |
| ABC | 120 | 200 | (none) |
| XYZ | 123 | 100 | (none) |
*Fig. 6D*
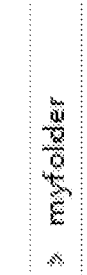
*Fig. 6A*
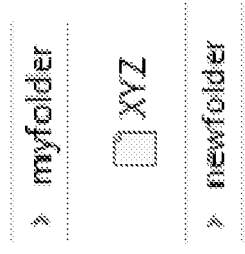
*Fig. 6C*

Before concatenation:

Naming Service
600

| File Name | File ID | Parent ID | Children ID(s) |
|---|---|---|---|
| myfolder | 100 | (none) | 120, 123 |
| ABC | 120 | 100 | (none) |
| XYZ | 123 | 100 | (none) |

Partial File Manager
700

| Partial File ID | File ID | Storage Provider ID |
|---|---|---|
| 1 | 123 (←→XYZ) | SP1 |
| 2 | 123 (←→XYZ) | SP2 |
| 3 | 123 (←→XYZ) | SP1 |
| 4 | 123 (←→XYZ) | SP2 |
| 5 | 120 (←→ABC) | SP1 |
| 6 | 120 (←→ABC) | SP2 |

FIG. 9A

After concatenation:

Naming Service
600

| File Name | File ID | Parent ID | Children ID(s) |
|---|---|---|---|
| myfolder | 100 | (none) | 130 |
| NEWFILE | 130 | 100 | (none) |

Partial File Manager
700

| Partial File ID | File ID | Storage Provider ID |
|---|---|---|
| 1 | 130 (←→NEWFILE) | SP1 |
| 2 | 130 (←→NEWFILE) | SP2 |
| 3 | 130 (←→NEWFILE) | SP1 |
| 4 | 130 (←→NEWFILE) | SP2 |
| 5 | 130 (←→NEWFILE) | SP2 |

FIG. 9B

MAPPING STORAGE ACROSS STORAGE PROVIDERS

CROSS-REFERENCE TO RELATED APPLICATIONS

This patent application claims the benefit under 35 U.S.C. 119 of U.S. Code provisional patent application Ser. No. 62/469,413 filed on Mar. 9, 2017, and entitled "Pluggable Tiered Storage for Big Data Analysis Workload," which patent application is incorporated herein by reference.

BACKGROUND

Computing systems and associated networks have greatly revolutionized our world. The interconnection of such computing systems into networks has resulted in explosive growth in the ability to communicate data ushering in what is now called the "information age." Information is often stored, managed and analyzed in a computer readable medium. In recent years the volume of data stored in a computer readable medium has grown rapidly, ushering in technology often referred to as "big data." Such data growth is multi-dimensional, including increasing volume (amount of data), velocity (speed of data in and out), and variety (range of data types and sources). For example, individual files can be petabyte-scale, and individual jobs may be executed over more than 10 k computing systems, and/or may take several weeks to complete.

Files can be stored in various types of storage providers, each provider having its own mechanism for storing a file. For instance, a storage provider might have a formal file management system, in which a file has both a name and a location within a directory hierarchy. Furthermore, a storage provider might simply have a naming convention which uniquely names files without reference to a directory hierarchy. In addition, storage providers may be equipped to store structured data, or may utilize blob storage, in which the stored data has little, if any, structure, and a schema is applied to the file upon reading all or a portion of the file. There are also local storage providers and distributed storage providers. The number and variety of available storage providers is large.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiment described herein relates to a system that maps files into multiple parts and causes each part to be stored within a respective storage provider. For instance, a file may be distributed, with different parts of the file stored in different storage providers. The mapping facilitates this by correlating each of the multiple parts to a corresponding storage provider which may be different than the storage provider that stores a different part of the same file. The system then initiates storage of each of the multiple parts of the file in each of their corresponding storage providers in accordance with the mapping, and using a storage-provider-facing application program interface (API). Similarly, retrieval and/or editing of a partial file may be accomplished by referencing the mapping, and using the same API issued to the appropriate storage provider. Each storage provider is capable of interfacing with the system using this same storage-provider-facing API.

The principles described herein may be efficiently performed on massively distributed data and tiered file management systems, in which case multiple storage providers may be used to store large files. Whenever one or more storage providers is to be added to the file management system, they may be added without the need for migrating large cluster of data from one storage provider to the other. The new storage provider would likewise be capable of interfacing with the system using the storage-provider-facing API. Thus, the system is pluggable in the sense that new storage providers that honor the storage-provider-facing API may be easily added to the system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6A illustrates an example hierarchical structure of files;

FIG. 6B illustrates a naming service that facilitates a hierarchical structure of FIG. 6A;

FIGS. 6C and 6D illustrate an example of a file moving operation that is completed via updating naming service entries;

FIGS. 8, 9A and 9B illustrate an example of a concatenation operation that is completed via merely updating the entries of the naming service and partial file manager;

DETAILED DESCRIPTION

At least some embodiment described herein relates to a system that maps files into multiple parts and causes each part to be stored within a respective storage provider. For instance, a file may be distributed, with different parts of the file stored in different storage providers. The mapping facilitates this by correlating each of the multiple parts to a corresponding storage provider which may be different than the storage provider that stores a different part of the same file. The system then initiates storage of the multiple parts of the file in each of their corresponding storage providers in accordance with the mapping. This storage is initiated via the use of a storage-provider-facing application program interface (API). Similarly, retrieval and/or editing of a partial file may be accomplished by referencing the mapping, and using the same API issued to the appropriate storage provider. Each storage provider is capable of interfacing with the system using this same storage-provider-facing API.

The principles described herein may be efficiently performed on massively distributed data and tiered file management systems, in which case multiple storage providers may be used to store large files. Whenever one or more storage providers is to be added to the file management system, they may be added without the need for migrating large clusters of data from one storage provider to the other. The new storage provider would likewise be capable of interfacing with the system using the storage-provider-facing API. Thus, the system is pluggable in the sense that new storage providers that honor the storage-provider-facing API may be easily added to the system.

Because the principles described herein operate in the context of a computing system, a computing system will be described with respect to FIG. 1. Then, the principles of tiered file management system will be described with respect to FIGS. 2 through 11.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
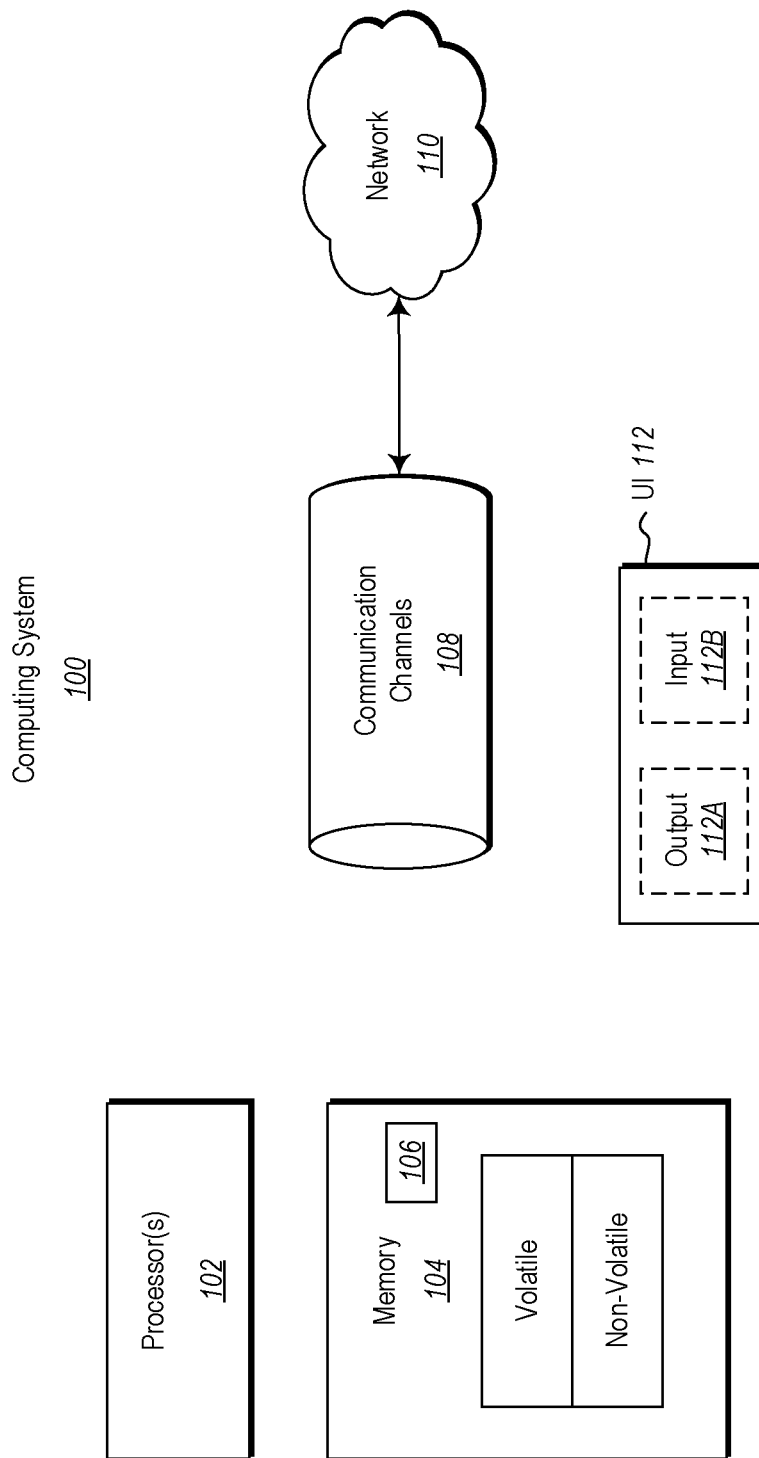
FIG. 1 illustrates an example computing system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the executable component may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

In a typical distributed network computing system, a processor may execute computer-executable instructions and read data from storage medium. Ranked by the efficiency of reading data, fetching data from local RAM is fastest, followed by local disk and then shipping data across network. Ranked by the scarcity and cost of storage medium, local RAM is limited, expensive and under high usage contention, local disk comes next, and remote storage is ample and hence ideal for a program to store data across network. Given the aforementioned Scarcity vs. Execution Burden Factor matrix, a more optimized program operated in the aforementioned network computing system should minimize the data movement across network when possible and if not, spill data to remote disks to leverage faster storage medium remotely.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
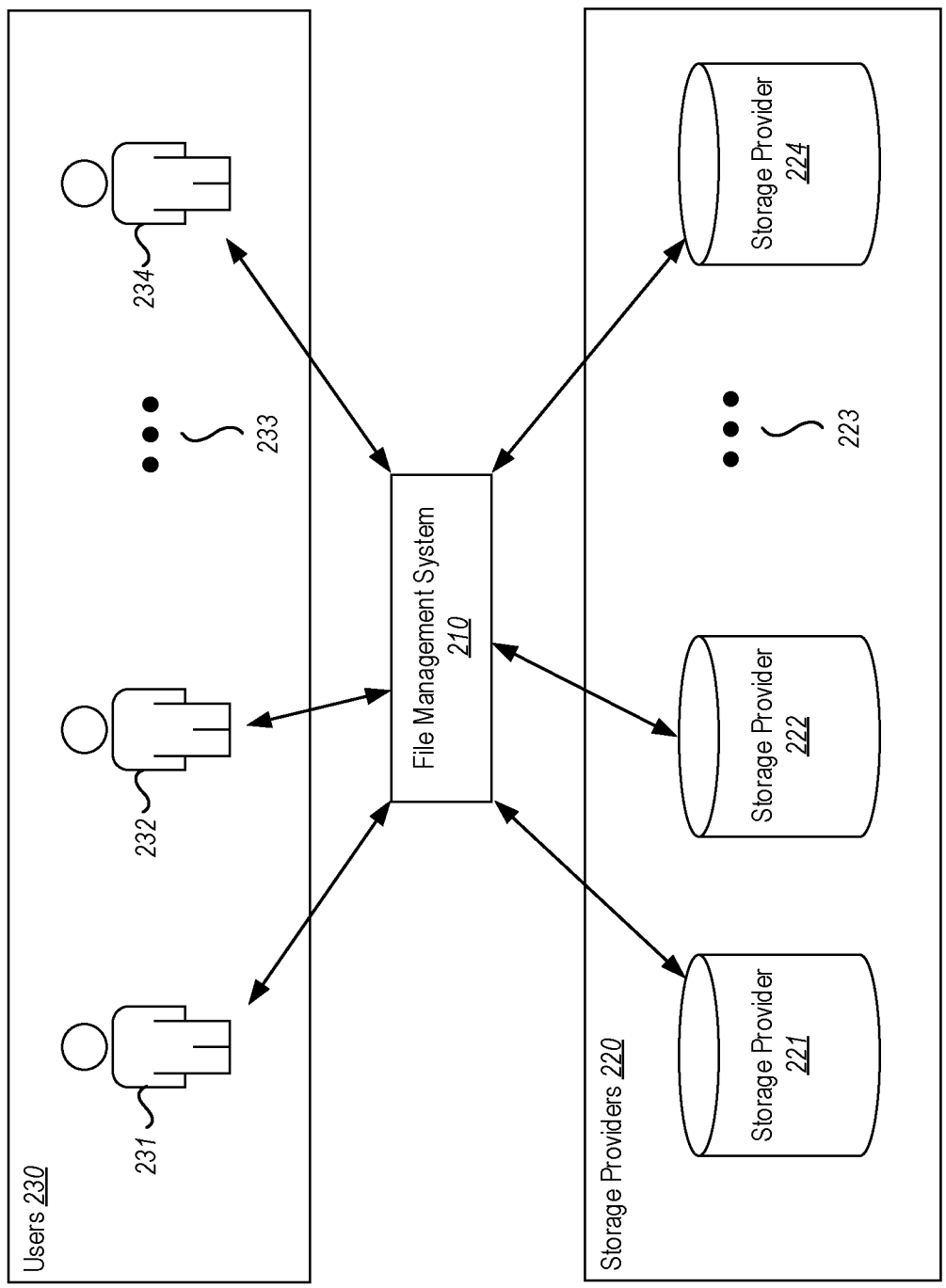
FIG. 2 illustrates an environment in which a file management system described herein may be employed.

FIG. 2 illustrates an environment 200 in which the file management system 210 described herein may be employed. The file management system 210 may be a computing system 100 of FIG. 1 or an executable component 106 running on that computing system 100. Users 230 may use the file management system 210 to perform file management functions as represented by the bidirectional arrows between each user 230 and the file management system 210. As illustrated in FIG. 2, there may be multiple users 230, including users 231, 232, and 234. However, the ellipsis 233 represents that there may be more or less users that interface with the file management system 210 than those that are illustrated in the environment 200. Furthermore, the number of users in the set of users 230 may change over time.

Meanwhile, the file management system 210 manages multiple storage providers 220. In order to support the user requests, the file management system 210 interfaces with each of these storage providers 220 as represented in FIG. 2 by the bidirectional arrows between each of the storage providers 220 and the file management system 210. As also represented by these bidirectional arrows, a response to the request is provided to each user and rendered to the user via a user application.

In FIG. 2, the multiple storage providers 220 includes storage providers 221, 222, and 224. However, the ellipsis 223 represents that there may be more or less storage providers in the environment 200 than those illustrated. Each of the storage providers 220 may execute provider-specific storage functions that are specific to the corresponding storage provider. For instance, such functions may be implemented by a respective computing system. That respective computing system may be an instance of the computing system 100 of FIG. 1 or an executable component 106 running on that computing system 100.

The users 230 see the file management system 210 as a unified system and operates at the granularity of an entire file (rather than at the granularity of portions of a file). In other words, the users request operations to be performed on files. To support large distributed files, the file management system 210 segments each file into one or more parts and stores each partial file in one or more of the storage providers 220.

The file management system 210 allows any part of a file to be stored in one or more of multiple storage providers automatically, either arbitrarily or as dictated by policy or performance goals. Furthermore, the storage providers may be local storage providers that are local to the file management system 210, or may be remote from the file management system 210. The storage providers 220 may collectively be distributed. Even more, any given storage provider may also be distributed, though not required.

In any case, the storage providers 220 collectively provide flexibility in distributing data across the storage providers 220 regardless of the characteristics of those storage providers. Thus, the user may interface with files that happen to be distributed across storage providers without knowledge that the files are distributed/segmented or knowledge of the locations of the partial files.

Figure 3:
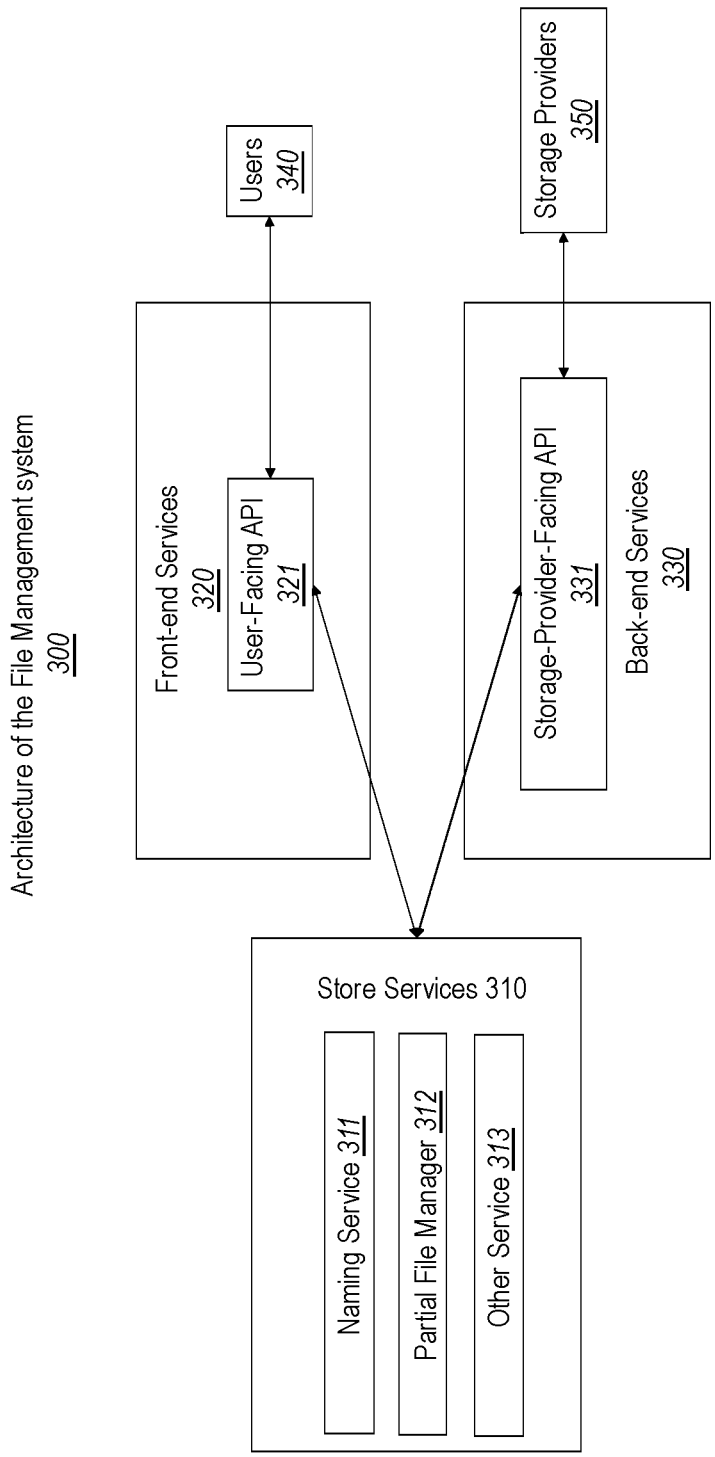
FIG. 3 illustrates a file management system that represents an example of the file management system of FIG. 2.

FIG. 3 further illustrates a file management system 300 that represents an example of the file management system 210 of FIG. 2. The file management system 300 includes a front-end services component 320 (hereinafter referred to as "front-end services"), a back-end services component 330 (hereinafter referred to as "back-end services") and store services component 360 (hereinafter referred to as "store services"). The front-end services 320 includes a user-facing Application Program Interface (API) 321, which communicates with users 340, who may be the users 230 of FIG. 2. The users 340 may request data access via communicating with the user-facing API 321, and responses are also provided via the user-facing API 321. The back-end services 330 includes a storage-provider-facing API 331 that communicates with each of the storage providers 350, which may be the storage providers 220 of FIG. 2.

Store services 310 includes a naming service component (hereinafter referred to as "naming service") 311, a partial file manager 312, and may also include some other services 313. The naming service 311 associates file names (which may be more human-readable) with unique file identifiers for files across the file management system 300. An example of the naming service 311 is further illustrated in FIGS. 6A and 6B and will be described in further detail further below.

Figure 7:
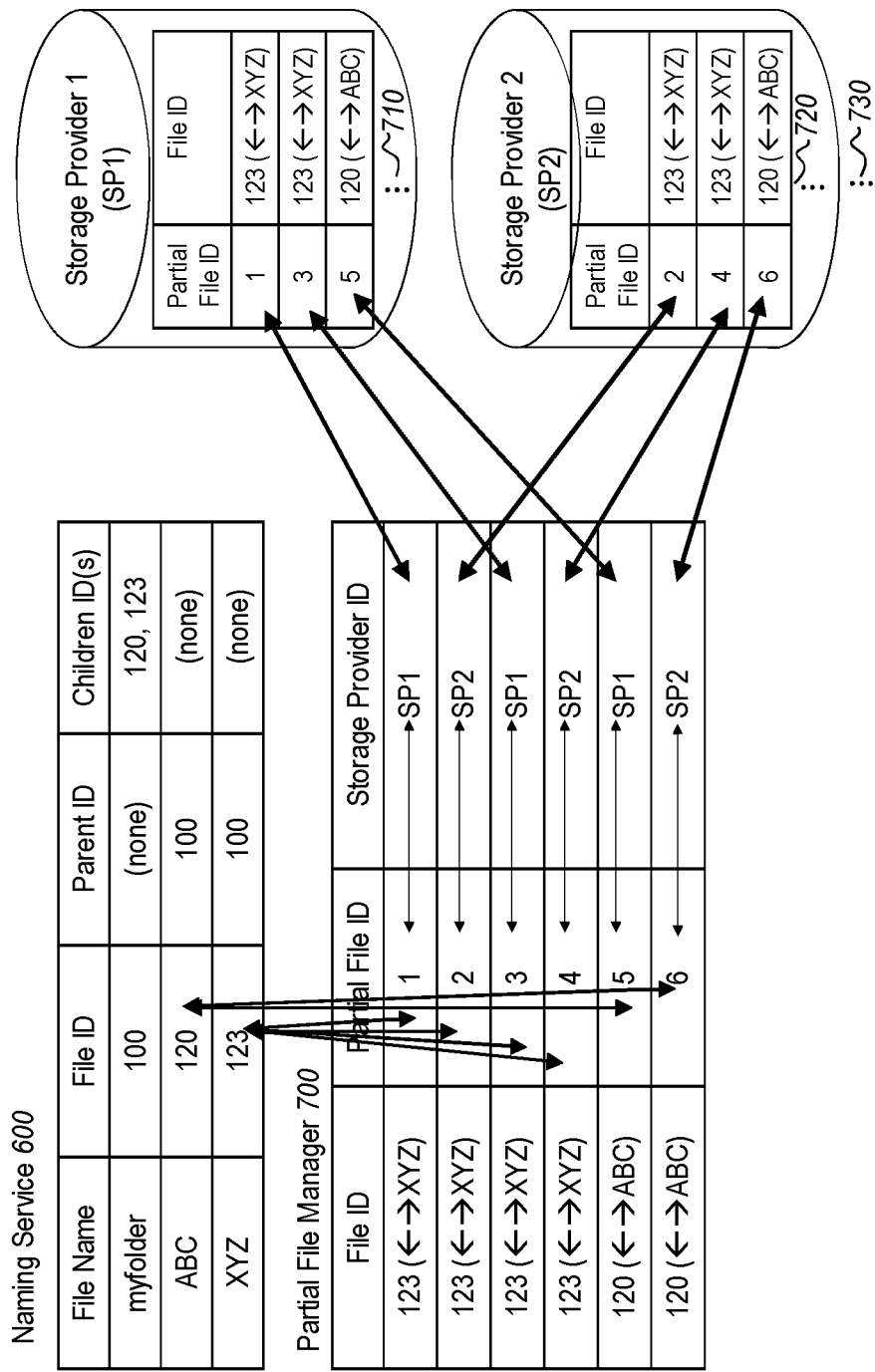
FIG. 7 illustrates an environment that builds upon the example of FIG. 6A.

As previously mentioned, each file is broken down into one or more partial files for storage into respective storage providers. The partial file manager 312 maintains a list of partial files and the storage provider in which the partial file is stored. An example of the partial file manager 312 is illustrated in FIG. 7 and will be described in further detail further below.

Other services 313 may include (but are not limited to) services that are helpful for the store services to interface in specific ways that are expected by a specific storage provider. For instance, the other services 313 may include an extent management service for storage providers that deals with extents and do not have a suitable extent manager. An extent is a segment of data that is used in append-only systems and may be reused for multiple files. The other services 313 may also include a secret management service that may be used to handle secrets, including (but not limited to) keys to access secured storage accounts.

In some embodiments, the file management system 300 may redundantly store a file. For instance, multiple instances of the file may be stored in different locations. In this case, all parts of the file are redundantly stored. Furthermore, the file management system 300 may store only some of a file redundantly. In that case, the file management system 300 may redundantly store less than all of the parts of the file. As an example only, such might be the case if the file management system 300 has snapshotted the file, in which case a part of a file that has not changed since the snapshot time may happen to be redundantly stored. Such might also be the case if the file management system 300 provides versioning, when a part of the file has not changed between versions. Any given part of a file may even be redundantly stored by different storage providers. When redundant storage of a part of a file is performed, the partial file manager 312 has record of the multiple possible locations of the part of the file.

Figure 4:
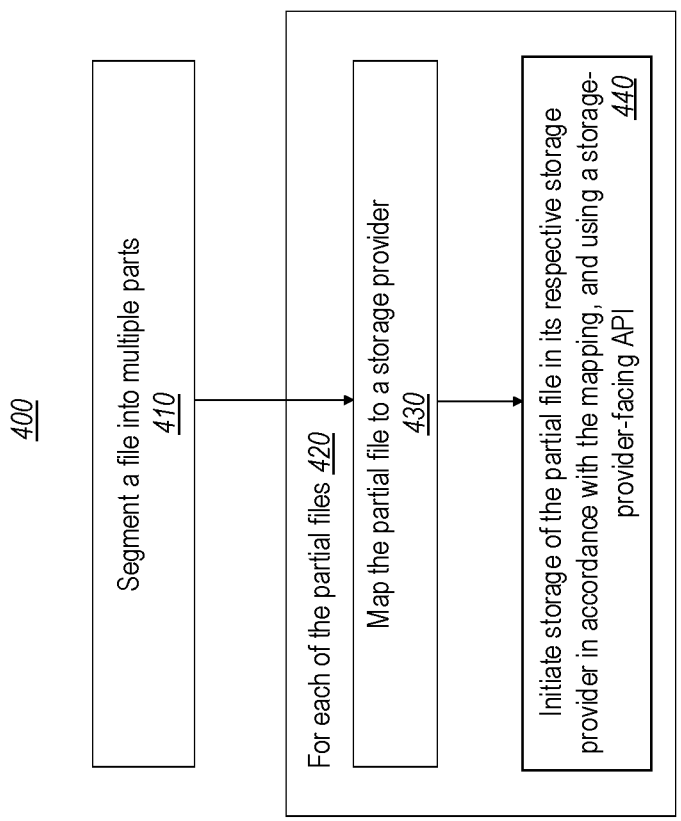
FIG. 4 illustrates a flowchart of a method that may be implemented in the file management system of FIG. 3 for mapping and storing partial files in multiple storage providers.

FIG. 4 illustrates a flowchart of a method 400 that may be implemented by the file management system 300 for mapping and storing multiple parts of a file (i.e., partial files) with different storage providers. First, each of the files is segmented into multiple parts (act 410). The remainder of the method 400 (identified by the content of box 420) is performed for each partial file that was created by this segmentation. Specifically, each partial file is mapped to a corresponding storage provider (act 430). Further, the storage of the partial file is initiated into the corresponding storage provider (act 440). As an example, with reference to FIG. 3, this storage may be initiated by the file management system 300 using the storage-provider-facing API 331.

The result of the method 400 is that the file management system 300 causes the multiple partial files of a file to be stored in their corresponding storage providers in accordance with the mapping. Since the mapping is performed at the granularity of a partial file, and since partial files may each be independently stored in storage providers regardless of the selection of the storage providers for other partial files, the partial files may be stored in different storage providers. Thus, the file may be stored in a distributed fashion across multiple (and perhaps many) storage providers.

Figure 5:
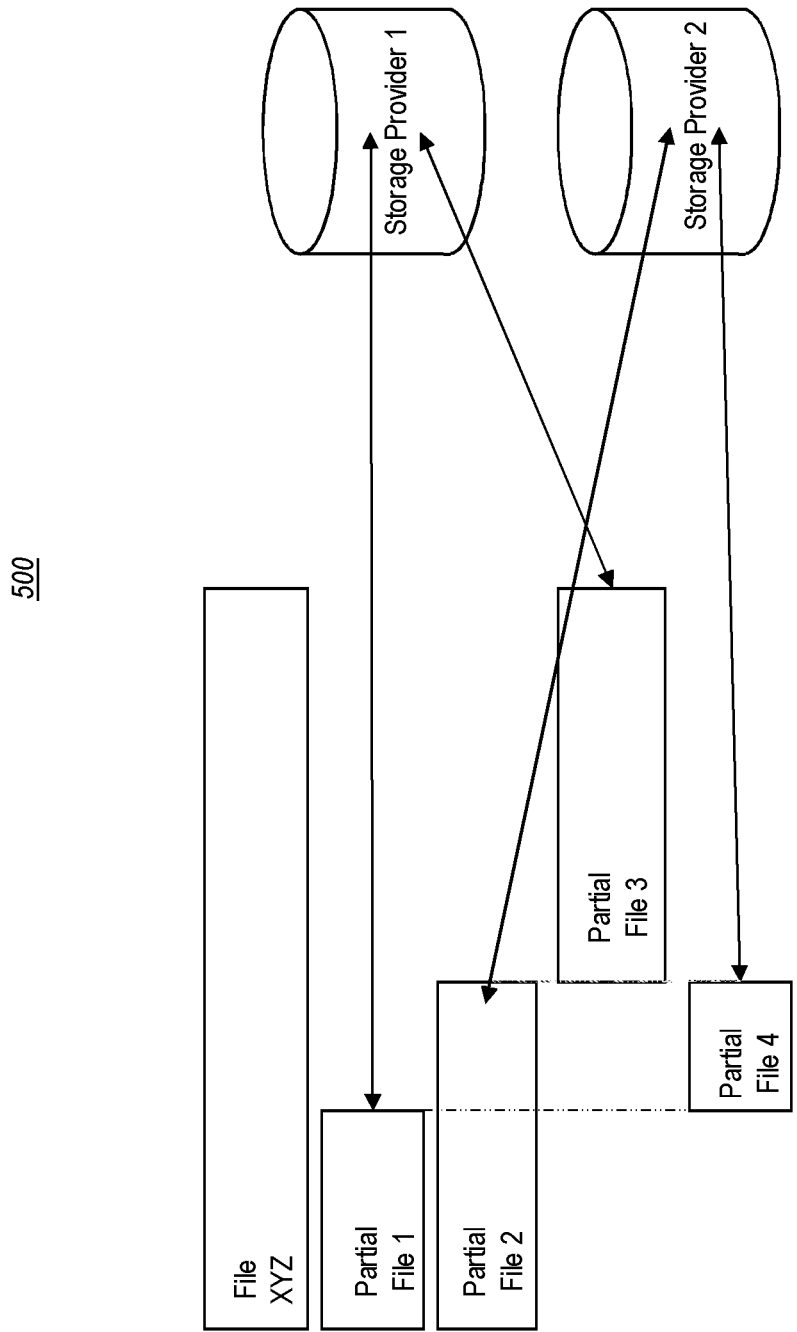
FIG. 5 illustrates an example file "XYZ" that is stored as multiple partial files.

FIG. 5 illustrates an example file "XYZ" being stored as multiple partial files. When a file is stored as multiple partial files by the file management system 300, the set of partial files contains a complete set of data for the entire file. However, although not required, some of the partial files may overlap. Also, although again not required, files and partial files may also be replicated in different storage providers, such that the same data may be accessed through multiple storage providers.

For instance, in FIG. 5, the file "XYZ" is stored as partial files 1, 2, 3 and 4. The partial file 2 overlaps with partial file 1. In fact, partial file 2 includes all the data contained in partial file 1. Partial file 3 does not overlap with any other partial files. The partial file 4 overlaps with the tail part of partial file 2. The dashed lines represent that the partial file 4 does not overlap with the partial files 1 and 3, but the three partial files 1, 3, and 4 are consecutive partial files. The set of partial files 1, 2, 3 and 4 combined together contains the complete file "XYZ". As illustrated in FIG. 5 and represented by the bidirectional arrows, partial files 1 and 3 of the file "XYZ" are mapped and stored within the storage provider 1, and partial files 2 and 4 of the file "XYZ" are mapped and stored within the storage provider 2.

When a part of the half of the file "XYZ" is to be read, the file management system 300 may automatically select a partial file that contains that part of the file that is to be read. For instance, if a user selects a portion of the file contained within partial file 1, then the file management system 300 may select to access either partial file 1 or partial file 2 for reading, and then provide that portion to the user or the user application via the user-facing API 321. Alternatively, if the part of the file that is to be read happens to be within partial file 4, then partial file 4 may be accessed for the read.

Additionally, there are other file operations that may be completed using different combinations of partial files. For instance, when a user application instructs the file management system 300 to access the entire file "XYZ", the file management system will perform those partial file operations that result in the reconstruction of file "XYZ." In this example, the file management system 300 has several options for reconstruction of the file "XYZ." As one option, partial files 1, 3 and 4 may be concatenated together to reconstruct the complete file "XYZ," which is then provided to the user or user application via the user-facing API 321. The file management system 300 knows to access the partial files 1 and 3 from the storage provider 1 and to access partial file 4 from the storage provider 2, by referring to the partial file manager 312. As another option, partial files 2 and 3 may be concatenated together to reconstruct the complete file "XYZ." In that case, again with the assistance of the partial file manager 312, the file management system knows to access the partial file 2 from storage provider 2, and the partial file 3 from storage provider 1. The file management system 300 may thus, in this particular example, select one of the multiple ways to reconstruct the entire file "XYZ."

In some embodiments, such selections may be random or arbitrary. In some other embodiments, the selection may be based on a number of factors, including (but not limited to) the characteristics of storage providers, the users' credentials, locality of the storage providers, the access patterns of the data, and so forth. For instance, some storage providers may be local or closer to the user, and some other storage providers may be remote or further from the user. The file management system 300 may select the storage providers that are closer to the user for the data access operations. In another example, the user's credentials may only allow him/her to access some storage providers, but not the other storage providers. Accordingly, the file management system 300 may select the storage providers that the user's credentials allow access to. The principles described here are, however, not limited to the decision making regarding how to perform the partial file operations based on the file access request from a user.

The file management system 300 may be structured hierarchically or not hierarchically (i.e. flat or linear). In general, a non-hierarchical file management system requires each file have a unique file name (i.e., has a non-hierarchical namespace); and a hierarchical file management system associates file names with hierarchical file namespace (e.g., a directory structure), such that two files associated with different directories may share the same name. The files of a non-hierarchical system are often termed "blobs". In this description and in the claims, the term "file" is to be interpreted broadly so to encompass the meaning of the term "blob." The file management system 300 may also be an object store.

FIG. 6A illustrates an example hierarchical structure of files, in which case the file management system would be a file system in which files are organized into a directory structure. In the case of FIG. 6A, "ABC" and "XYZ" are located within a folder called "myfolder". FIG. 6B illustrates a naming service 600 that facilitates the hierarchical structure of FIG. 6A. Accordingly, the naming service 600 of FIG. 6B represents an example of the naming service 311 of FIG. 3, and is used to implement a hierarchical file management system having the directory structure illustrated in FIG. 6A.

Referring to FIG. 6B, the naming service 600 associates a unique identifier (in FIG. 6B referred to as "file ID") with each of the files that are managed by the file management system 300. For instance, in a hierarchical file management system illustrated in FIG. 6A, the naming service 600 of FIG. 6B enables the implementation of the file management on both files and folders. In such a hierarchical file management system, the naming service 311 associates a file ID to each of the folder names and file names.

For instance, the naming service 600 associates the folder "myfolder", file "ABC" and file "XYZ" with each of the file IDs 100, 120 and 123. In the case of a hierarchical file management system, the naming service 600 also records the parent and child file ID(s) of each of the files or folders. For example, in FIG. 6B, files "ABC" and "XYZ" are stored in folder "myfolder". Therefore, the folder "myfolder" is the parent of each of files "ABC" and "XYZ", and files "ABC" and "XYZ" are the children of the folder "myfolder". Since the file ID of "myfolder" is 100, the parent file ID of each of the files "ABC" and "XYZ" is 100. Similarly, since the file IDs of files "ABC" and "XYZ" are 120 and 123, the child file IDs of folder "myfolder" are 120 and 123. Note that in a non-hierarchical system, there would be no need to track the parent and child identifiers for any file.

As apparent from an examination of FIG. 6B, the file identifiers are kept track of in a manner that is independent of the storage provider(s) used to store the given file or folder. Thus, the naming service 600 allows convenient and efficient file operations to be performed. For instance, to rename a file, the value in the corresponding File Name column is changed. To move a file within the directory structure, the values of the Parent ID and Children ID(s) are changed. These are small edit operations that are efficiently performed. Furthermore, the hierarchical structure itself may be efficiently changed by adding a new row to the naming service 600.

For example, FIGS. 6C and 6D illustrates an example of moving the file "ABC" from "/myfolder" to "/newfolder", which is completed merely via updating naming service entries. There is no need to actually move or operate upon the data of the file ABC itself. Instead, the naming service 600 generates a new entry associating a new file ID 200 with the new folder "newfolder", and the parent ID of the file "ABC" in the naming service 600 is changed from 100 to the new file ID 200. Then, the child IDs of the folders "myfolder" and "newfolder" are also updated to reflect the change. As such, the naming service 600 allows certain file management operations to be completed without moving or modifying the physical files.

FIG. 7 illustrates an environment that builds upon the example of FIG. 6A. In particular, the environment includes not only the naming service in the state as it exists in FIG. 6A, but also a partial file manager 700. The partial file manager represents an example of the partial file manager 312 of FIG. 3. The partial file manager 700 maps each file ID from the naming service 600 to a set of one or more partial files and associates each of the partial files with a unique partial file identifier (hereinafter referred to as "partial file ID").

For instance, as illustrated in FIG. 7, the naming service 600 associates a file ID 120 for the file "ABC", and associates a file ID 123 with the file "XYZ". The partial file manager 700 maps each of the files "ABC" and "XYZ" to one or more partial files, and associates each of the four partial files with a partial file ID. For instance, the partial file manager 700 maps the file "XYZ" to four partial files, and each of the partial files of the file "XYZ" is associated with each of the partial file IDs 1 to 4 (much like the example of FIG. 5). Similarly, the partial file manager 700 maps the file "ABC" to two partial files, and associates each of the partial files of the file "ABC" with each of the partial file IDs 5 and 6. The bidirectional arrows between the file IDs and the partial file IDs represent that the file with the file ID (at one end of the arrows) is mapped into the corresponding partial files with the partial file IDs (at the other end of the arrows).

The partial file manager 700 also maps each partial file ID to the storage provider that the partial file is stored in. Each storage provider may be associated with a storage provider identifier (hereinafter referred to as storage provider ID). For instance, as illustrated in FIG. 7, storage provider 1 is associated with a storage provider ID SP1, and the storage provider 2 is associated with a storage provider ID SP2. The ellipsis 730 represents that there may be more or less storage providers in the file management system 300 than those illustrated. The bidirectional arrows between the partial file IDs and the storage provider IDs represent that the partial file with partial file ID (at one end of the arrows) is mapped into the corresponding storage provider with the storage ID (at the other end of the arrows).

The partial file manager 700 also causes each of the partial files to be stored in the storage providers that are mapped to each of the partial files. The bidirectional arrows between the storage provider IDs and each of the storage providers represent that the partial file mapped to the storage provider ID (at one end of the arrows) is stored at the corresponding storage provider (at the other end of the arrows). For instance, the partial files that have partial file IDs 1, 3, and 5 are stored in storage provider 1 (which has a storage provider ID SP1). Similarly, partial files that have partial file IDs 2, 4 and 6 are stored in storage provider 2 (which has a storage provider ID SP2). As illustrated in FIG. 7, the partial file manager 700 maintains the list of partial file IDs 1 to 6 along with the corresponding storage provider ID for each of the partial files. The ellipsis 710 and 720 represent that there may be more partial files that are stored in the storage providers 1 and/or 2 than those illustrated.

Even though the partial file manager 700 maps each partial file ID to the storage provider in which that partial file is stored, the partial file manager 700 does not need to understand or represent the internal structure of the partial files, because the internal structure of partial files is generally delegated to the specific storage provider. When one storage provider is getting full, the partial file manager 700 may automatically generate a new partial file in a different storage provider.

When new storage providers are added into the file management system 300, the partial file manager 700 may map partial files to the new storage providers without additional user input. Because the internal structure of partial files is generally managed by the specific storage provider, the file management system 300 is not only capable of being expanded to include existing storage providers, but also to include future storage providers that use different hardware technologies and data structures. At this information age, data is gathered at a fast pace, and such a pace continues to accelerate. Also, new technologies are being developed every day. The principles described herein allow for an expandable file management system that is ready for new storage providers and technologies, especially where such new providers honor the storage-provider-facing API.

Furthermore, in some embodiments, the partial file manager 700 may automatically optimize the storage usage based on the characteristics of storage providers, the users' credentials, locality of the storage provider, and/or access patterns of the data. For instance, different types of storage may have different performance and cost. Generally, the storage providers that perform better are more expensive. Storage providers may be classified as different tiers based on its performance and/or cost. For example, there may be local tiers and remote tiers. Local storage tiers may include, but are not limited to, RAM, SSD, and HDD. On the other hand, remote storage providers are generally accessed via computing networks. Storage tiers can also have different levels of data protection. For instance, top-secret files might be stored on expensive and high-quality media (e.g., SSD) as tier 1 data; classified files might be stored on less-expensive media in a conventional storage as tier 2 data; and unclassified files might be stored on remote storage as tier 3 data. Also, data may be ranked by how often it is accessed. Generally, the most frequently accessed data is stored on the highest performing storage, and rarely accessed data is stored on low-performance and/or cheaper storage (e.g., a remote storage).

The partial file manager 700 may automatically map new data to different storage providers based on the importance or secrecy level of the data. The higher performance storage is likely to be mapped to store more important or more secret data, and the lower performance storage is likely to be mapped to store less important or less secret data. The partial file manager 700 may also automatically move less frequently accessed data from a local storage to a remote storage, and move frequently accessed data from a remote storage to a local storage.

In one example implementation, each partial file may be sealed or unsealed. In that case, the partial file manager 700 would keep track of the sealed status for any given partial file. In this case, when a partial file is sealed, its length and other properties are made permanent. The tail partial file of a given file is an example of a partial file that would not be sealed (at least in an append-only system in which files are edited by adding to the end of the file). For instance, the third partial file of the "XYZ" (associated with a partial file ID 3) is the tail of the file "XYZ". Similarly, the second partial file of file "ABC" (associated with a partial file ID 6) is the tail partial file of the file "ABC". In some embodiments, only the tail partial file may be unsealed, and the rest of the partial files are all sealed. For each of the sealed partial files, the size of the partial file may also be recorded in the partial file manager 700. This allows the file management system to correlate file locations with a partial file, and a location within that partial file.

The partial file manager 700 generally manages the multiple storage providers without involvement of the naming service 600. The storage provider of any partial files can change, even after a file is sealed. The file management system 300 may also automatically move a partial file from one storage provider to another storage provider based on any policy. When a partial file is moved from one storage provider to another storage provider, the partial file manager 700 updates its entries corresponding to the moved partial file from the previous storage provider to the current storage provider. Such movement may not be known by the users, because the file ID entry in the naming service 600 remains the same despite such a move. For instance, when a partial file is moved from the storage provider 1 to the storage provider 2, the partial file manager 700 updates the storage provider ID of the partial file from SP1 to SP2.

Additionally, there are several more file operations that may be completed via updating the entries of the naming service 600 and the partial file manager 700. Traditionally, such file operations often need to be completed by moving or modifying the physical files. For instance, a concatenation operation may be implemented by merely updating the entries of the naming service 600 and the partial file manager 700. Concatenation is an operation of joining two or more files to produce a single target file. Traditionally, a concatenation of two or more files generates a new physical file that combines the two or more files.

Figure 8:
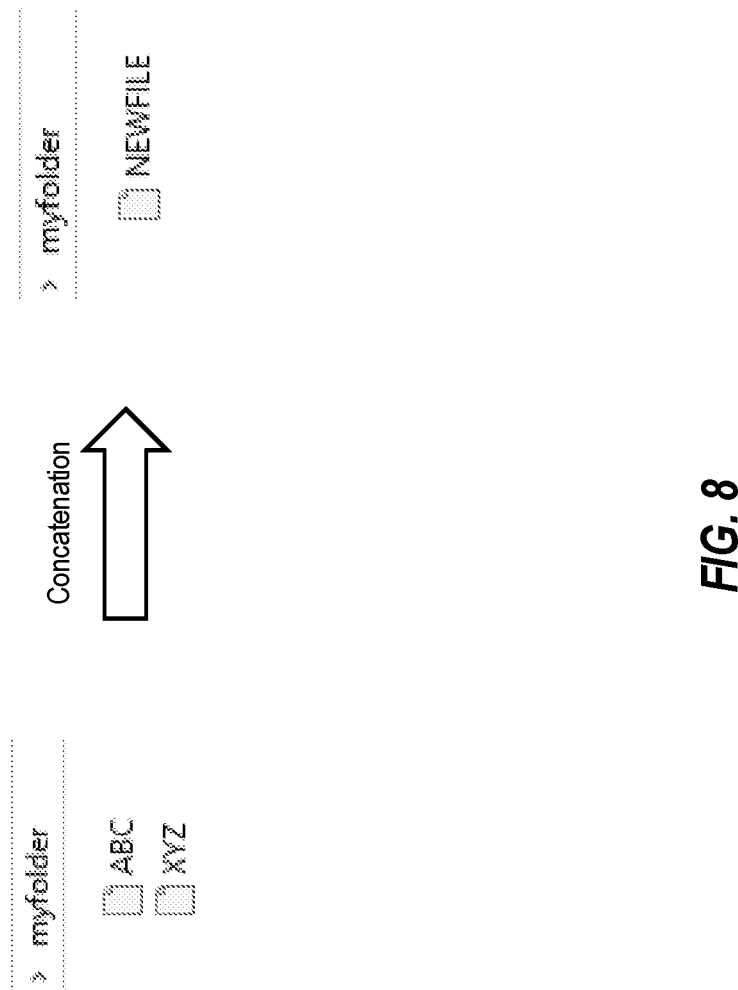

FIGS. 8, 9A and 9B illustrate an example of a concatenation operation that is completed via merely updating the entries of the naming service 600 and the entries of the partial file manager 700. FIG. 8 illustrates a user instruction that the files "/myfolder/ABC" and "/myfolder/XYZ" be concatenated to produce a new file "/myfolder/NEWFILE". FIG. 9A illustrates an example list of entries maintained in the naming service 600 and in the partial file manager 700 before the concatenation operation. FIG. 9B illustrates the list of entries of naming service 600 and partial file manager 700 after the concatenation operation.

First, the naming service 600 assigns a new file ID to the new file "NEWFILE". As illustrated in FIG. 9B, the new file ID assigned to the new file "NEWFILE" is 130. Then, the partial file manager 700 determines the set of partial files that will be included in the new file "NEWFILE". Here, since files "ABC" and "XYZ" are being concatenated, all the partial files of file "ABC" (with partial file IDs 1 to 4) and all the partial files of file "XYZ" (with partial files 5 and 6) should be included in the new file "NEWFILE". Accordingly, the partial files with partial file IDs 1 to 6 are determined to be included in the new file "NEWFILE".

Then, the partial file manager 700 updates all the file IDs of each of the determined partial files (i.e., the partial file with IDs 1 to 6) to 130 (from previous file IDs 120 and 123) in the entries of the partial file manager 700. Finally, the naming service 600 replaces files "ABC" and "XYZ" in the naming service 600 with the new entry "NEWFILE", and updates the entry for "myfolder" to have only "NEWFILE" as a child. Accordingly, the concatenation operation of the two files "/myfolder/ABC" and "/myfolder/XYZ" are completed by merely updating the entries in the naming service 600 and the partial file manager 700.

Figure 10:
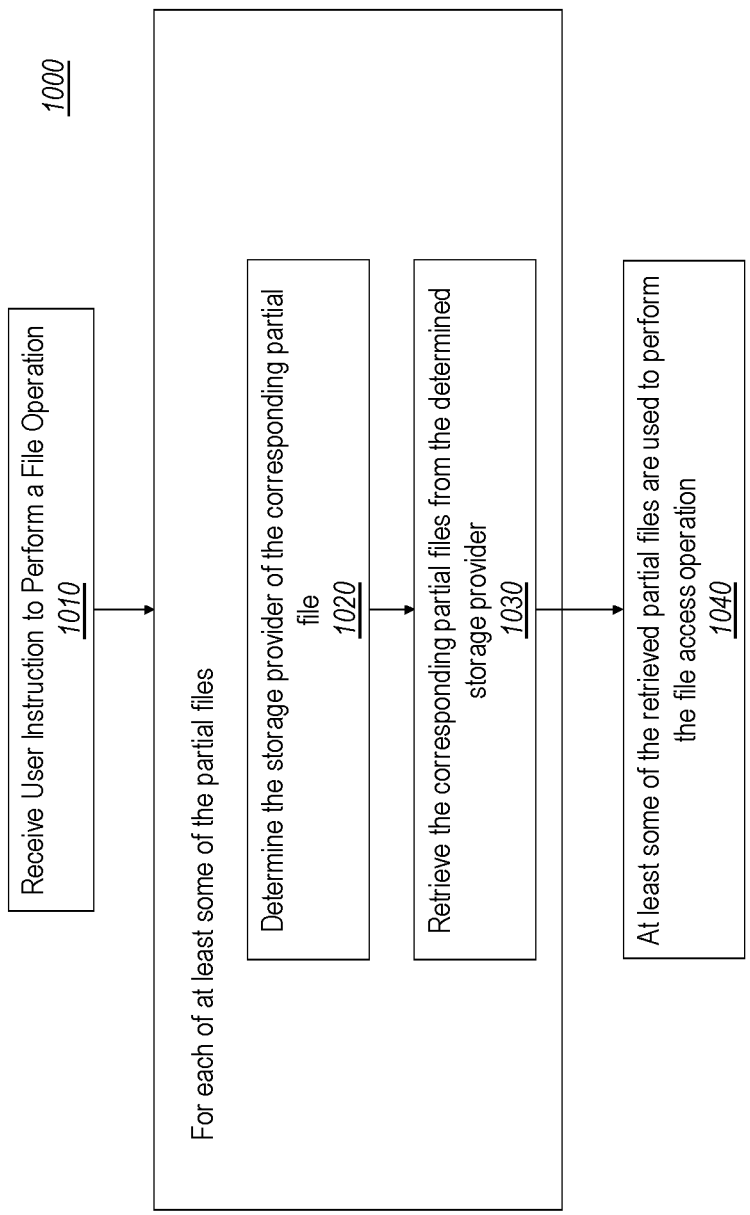
FIG. 10 illustrates a flowchart of a method that allows a user to perform file accessing operations via the file management system of FIG. 3.

FIG. 10 illustrates a flowchart of a method 1000 that allows a user to perform file accessing operations via the file management system 300. First, the file management system 300 receives a user instruction to access a file (act 1010). In response, for each of at least some of the partial files, the storage provider that stores the corresponding partial file is determined (act 1020). Then, the corresponding partial file is retrieved from the determined storage provider (act 1030). At least some of the retrieved partial files are used to perform the file access operation (act 1040).

The determining of the storage provider of each of some of the partial files (act 1020) may be implemented via the naming service 600 and the partial file manager 700. The naming service 600 determines the file ID that is associated with the file name that the user has provided. Then, the partial file manager 700 retrieves each of the partial file IDs that are contained in the file (associated with the file ID)—or at least those required to perform the file operation. Also, the partial file manager 700 determines each storage provider of the corresponding partial files based on the retrieved partial file IDs (act 1020). Finally, based on the retrieved storage provider, at least some of the partial files that comprise the file are retrieved and used to perform the file operation (act 1040).

For example, returning to FIG. 7, if a user instruction has requested the file management system 300 to read all of the file "ABC", in response to the user instruction, the naming service 600 retrieves the file ID of the file "ABC" based on the entries maintained in the naming service 600. Here, the file ID of the file "ABC" is retrieved as 120. Then, the partial file manager 700 uses the retrieved file ID 120 to locate each of the partial files of the file "ABC". Here, there are only two partial files that are associated with the file ID 120. The partial file IDs of the two partial files are partial file IDs 5 and 6. Furthermore, each of the storage providers that store these partial files are identified by the partial file manager 700. Here, the storage provider IDs corresponding to each of the partial files 5 and 6 are SP1 and SP2, respectively. Accordingly, the partial file with partial file ID 5 is stored in the storage provider 1, and the partial file with partial file ID 5 is stored in the storage provider 2. Then, the partial files (with partial file IDs 5 and 6) may be retrieved from the storage providers 1 and 2, and at least one of the retrieved partial files with IDs 5 and 6 may be sent to the user for access. Depending on the user instruction, the partial files may be concatenated before being sent to the user for access, or only certain extents of a partial file may be sent to the user for access.

When the accessing of a file is a read operation, there are multiple techniques that may be implemented to complete the read operation. In some embodiments, all of the partial files of the file are retrieved. In some other embodiments, only some of the partial files of the file or some portions of a partial file are retrieved. For instance, a user application may specify a byte range to read. The same data in the byte range may be available in multiple storage providers, since there are overlapping data stored in more than one partial files. The file management system 300 may associate a performance value (e.g., tier number) to each of the storage providers to indicate each of their performances relative to each other. If the data is available in multiple storage providers, the file management system 300 may select the storage provider to read from based on selection policy. Once the file management system 300 determines which storage provider to read from, the partial file stored in the determined storage provider is retrieved and sent to the user.

For example, returning to FIGS. 5 and 7, if a user application instructs that bytes 0 to 9 are to be read from the file "/myfolder/XYZ", assuming partial files 1 and 2 both start at the beginning of the file and both are long enough to contain bytes 0 to 9, the file management system 300 has a choice of which partial file 1 or 2 to read from. The partial file 1 is stored with storage provider 1, and the partial file 2 is stored with storage provider 2. If storage provider 1 is a local storage or closer to the user, and the storage provider 2 is a remote storage or further from the user, the file management system 300 may select the partial file 1 stored with storage provider 1 to be sent to the user for read.

Figure 11:
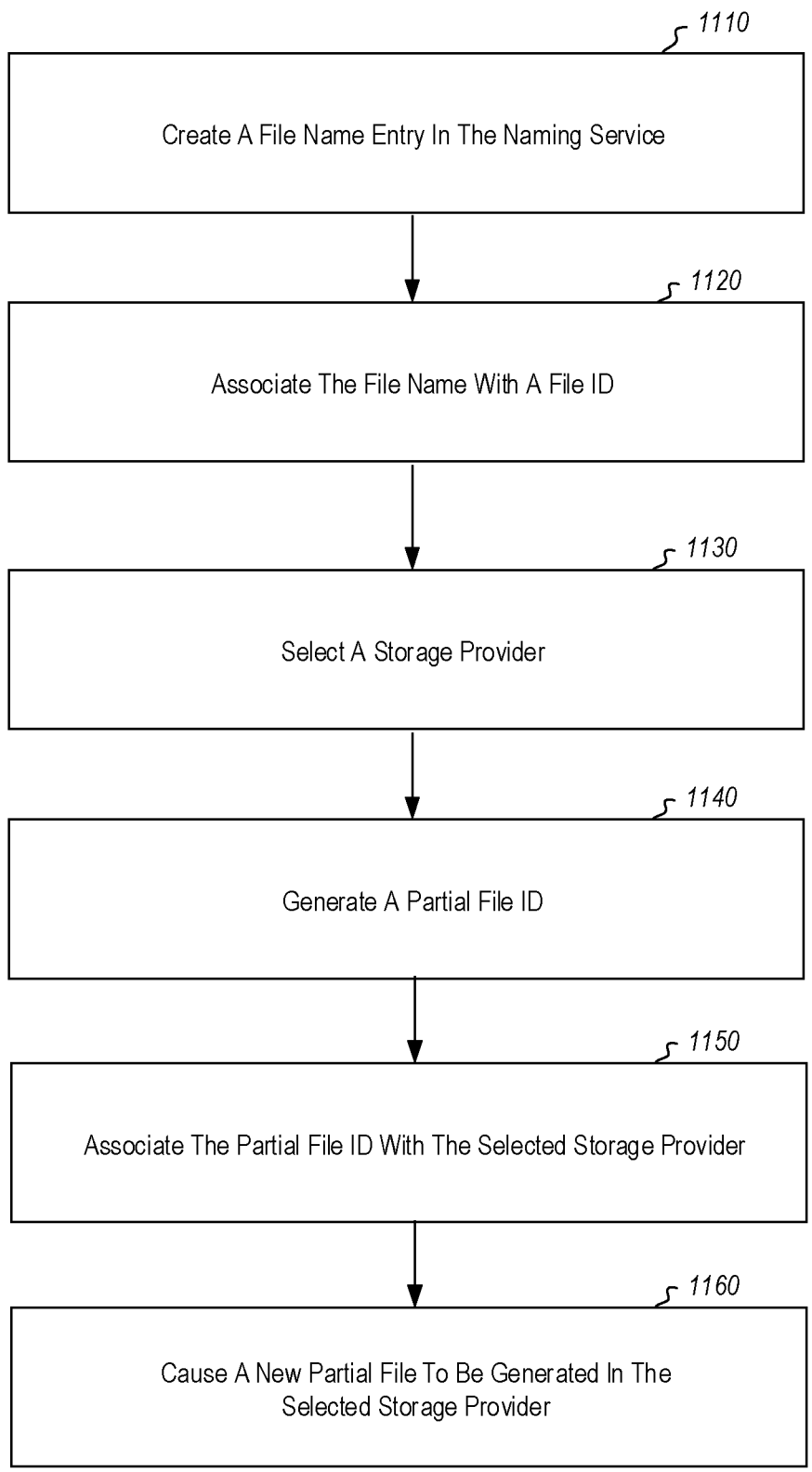
FIG. 11 illustrates a flowchart of a method that may be implemented by the file management system of FIG. 3 for creating a new file.

FIG. 11 illustrates a flowchart of a method 1100 that may be implemented by the file management system 300 for creating a new file. When a user requests to create a new file with a user-provided file name, a file name entry is created in the naming service 600 (act 1110). In addition, the naming service 600 generates a new file ID, and associates the file name with new file ID (act 1120). At any point at or prior to the first write to the file (from as early as file creation time to as late as first file write time), the partial file manager 700 selects a storage provider to be used to store the new file (act 1130). Since this is a brand-new file (or at least has not been written to before), only one partial file needs to be generated and stored at this moment. Accordingly, the partial file manager 700 generates one partial file ID, and associates the partial file ID with the selected storage provider (act 1150). Then, the storage-provider facing API 331 causes a new partial file to be generated in the selected storage provider (act 1160). Note that as further partial files are later added to this file, those partial files may be stored by different storage providers.

In addition to read, concatenation, and creating a new file, append is also a valid operation in append-only storage systems. Generally, neither the entries of the naming service 600 nor the entries of the partial file manager 700 need to be updated in append operations. To append to a file, the partial file manager 700 looks up the tail partial file from the entries it maintains. Then, the tail partial file is appended to. For instance, referring back to FIG. 7, if a user instruction requests to append to the file "XYZ", the naming service 600 determines that the file ID of the file "XYZ" is 123. Then, the partial file manager 700 determines that the tail partial file of file "XYZ" is the partial file with the partial file ID 3, and the partial file with partial file ID 3 is stored with the storage provider 1. If the append operation on the tail partial file does not exceed the storage provider's file length limit, the operation will not result any changes to the entries in the partial file manager 700 or the entries in the naming service 600.

However, in some situations, a new tail partial file needs to be generated in order to append to the file. For instance, if the tail partial file is not open, the partial file manager 700 may register a new partial file as a tail partial file, and appoint an appropriate storage provider to create the new tail partial file. In one example, if the append operation on the tail partial file exceeds the storage provider's file length limit, the operation will fail locally and cause the partial file manager 700 to seal the tail partial file and generate a new tail partial file (which may be mapped to a different storage provider). Then, the append operation may be completed to the newly generated tail partial file. In these situations, since a new tail partial file is generated, the partial file manager 700 will update its entries (e.g., add a row, update sealed status, and so forth) to reflect the newly generated tail partial file.

The file management system described herein allows data located across multiple storage providers to be automatically managed by a unified file management system. The file management system allows large files to be stored as multiple partial files in different storage providers (and/or via different tiers). Even though the storage of the files is transparent to the users, the partial files are not exposed to the users. Additionally, the file management system allows many file operations to be completed via merely updating entries of the naming service and the entries of the partial file manager, such that these file operations may be completed much faster than traditional file systems that require moving or modifying the physical files to complete the same operations.

Using the principles described herein, the file management system is capable of automatically managing an extremely large database and/or files across different storage providers. The file management system allows adding or removing storage providers, and is compatible with storage providers that implement different hardware technologies and/or data structures, including future technologies. The users or user applications may perform file management functions via the file management system against the data stored in each of the storage providers without the requirement of understanding the exact hardware technologies and data structures implemented by each of the storage providers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to store files across a plurality of storage providers, said computing system comprising:
one or more processors; and
one or more computer-readable hardware storage devices that store computer-executable instructions that are executable by the one or more processors to cause the computing system to at least:
map a file into a plurality of parts, wherein:
the plurality of parts includes a first set of partial files that, as a first combination, fully represent the file and a second set of partial files that, as a second combination, fully represent the file,
partial files included the first set of partial files are sized differently than partial files included in the second set of partial files,
each part of the plurality of parts is mapped to a corresponding storage provider, and
at least some parts of the file are mapped to different storage providers; and
initiate storage of the plurality of parts of the file in their corresponding storage providers in accordance with the mapping and using a storage-provider-facing application program interface,
wherein file identifiers assigned to the plurality of parts are independent relative to locations where the plurality of parts are stored within their storage providers, and wherein a file management operation, including a file identifier movement operation, that is performed against a particular file identifier of a particular file part included in the plurality of parts is performable without modifying a particular location of said particular file part within its corresponding storage provider.

2. The computing system in accordance with claim 1, wherein, in response to a user instruction to access the file, the computing system is further caused to:
for each of at least some of the parts of the file:
determine a location of the corresponding part of the file, wherein the location includes the storage provider that the corresponding part of the file is stored with;
retrieve the corresponding part of the file from the determined location where the corresponding part of the file is stored; and
provide at least some of the retrieved parts of the file to the user for access.

3. The computing system in accordance with claim 2, wherein the user instruction to access the file occurs via a user-facing application program interface that allows a user to identify the file but does not disclose identifications of the parts of the file.

4. The computing system in accordance with claim 2, wherein the user instruction to access the file comprises an instruction to perform a file read operation, and the determined one or more parts of the file comprises each of the plurality of parts of the file.

5. The computing system in accordance with claim 2, wherein the user instruction to access the file comprises an instruction to perform a partial file read operation, and the determined one or more parts of the file comprises less than all of the plurality of parts of the file.

6. The computing system in accordance with claim 1, wherein a plurality of files are operated on using the same application program interface for each of the plurality of files, each corresponding storage provider for each of the plurality of parts for each of the plurality of files being within a set of storage providers.

7. The computing system of claim 1, wherein:
a first partial file in the first set of partial files includes first content,
a second partial file in the second set of partial files includes second content,
a third partial file in the second set of partial files includes third content, and
the first content in the first partial file includes both the second content in the second partial file and the third content in the third partial file resulting in the first partial file overlapping both the second partial file and the third partial file.

8. A method for storing files across a plurality of storage providers, the method comprising:
mapping a file into a plurality of parts, wherein:
the plurality of parts includes a first set of partial files that, as a first combination, fully represent the file and a second set of partial files that, as a second combination, fully represent the file, partial files included in the first set of partial files are sized differently than partial files included in the second set of partial files,
each part of the plurality of parts is mapped to a corresponding storage provider, and
the parts of the file are mapped to different storage providers; and
initiating storage of the plurality of parts of the file in their corresponding storage provider in accordance with the mapping and using a storage-provider-facing application program interface,
wherein file identifiers assigned to the plurality of parts are independent relative to locations where the plurality of parts are stored within their storage providers, and wherein a file management operation, including a file identifier movement operation, that is performed against a particular file identifier of a particular file part included in the plurality of parts is performable without modifying a particular location of said particular file part within its corresponding storage provider.

9. The method in accordance with claim 8, the method being performed by a hierarchical file management system in which the files are identified within a hierarchical file namespace.

10. The method in accordance with claim 8, the method being performed by a non-hierarchical file management system in which the files are identified within a non-hierarchical file namespace.

11. The method in accordance with claim 8, the method being performed by an object store.

12. The method in accordance with claim 8, the file being redundantly stored.

13. The method in accordance with claim 8, at least one part of file being redundantly stored by different storage providers.

14. The method in accordance with claim 8, wherein the method further comprises the following in response to a user instruction to access the file:
for each of at least some of the parts of the file:
determining a location of the corresponding part of the file, wherein the location includes the storage provider that the corresponding part of the file is stored with; and
retrieving the corresponding part of the file from the determined location where the corresponding part of the file is stored; and
providing at least some of the retrieved parts of the file to the user for access.

15. The method in accordance with claim 14, wherein the user instruction to access the file occurs via a user-facing application program interface that allows a user to identify the file but does not disclose identifications of the parts of the file.

16. The method in accordance with claim 14, wherein the user instruction to access the file comprises an instruction to perform a file read operation, and the determined one or more parts of the file comprises each of the plurality of parts of the file.

17. The method in accordance with claim 14, wherein the user instruction to access the file comprises an instruction to perform a partial file read operation, and the determined one or more parts of the file comprises less than all of the plurality of parts of the file.

18. The method in accordance with claim 8, wherein the method is performed for a plurality of files using the same application program interface for each of the plurality of files, each corresponding storage provider for each of the plurality of parts for each of the plurality of files being within a set of storage providers.

19. A computer program product comprising one or more computer-readable storage media having thereon computer-executable instructions that are structured such that, when executed by one or more processors of a computing system, the computing system is caused to at least:

map a file into a plurality of parts, wherein:

the plurality of parts includes a first set of partial files that, as a first combination, fully represent the file and a second set of partial files that, as a second combination, fully represent the file, partial files included in the first set of partial files are sized differently than partial files included in the second set of partial files, each part of the plurality of parts is mapped to a corresponding storage provider, and at least some parts of the file are mapped to different storage providers; and initiate storage of the plurality of parts of the file in their corresponding storage provider in accordance with the mapping and using a storage-provider-facing application program interface, wherein file identifiers assigned to the plurality of parts are independent relative to locations where the plurality of parts are stored within their storage providers, and wherein a file management operation, including a file identifier movement operation, that is performed against a particular file identifier of a particular file part included in the plurality of parts is performable without modifying a particular location of said particular file part within its corresponding storage provider.

20. The computer program product in accordance with claim 19, wherein a hierarchical file management system manages files, including said file, and wherein the files are identified within a hierarchical file namespace.

21. The computer program product in accordance with claim 19, wherein a non-hierarchical file management system manages files, including said file, and wherein the files are identified within a non-hierarchical file namespace.

* * * * *